United States Patent [19]

Megusar et al.

[11] Patent Number: 4,885,128
[45] Date of Patent: Dec. 5, 1989

[54] METHOD FOR IMPROVING PERFORMANCE OF IRRADIATED STRUCTURAL MATERIALS

[75] Inventors: Janez Megusar, Belmont; Otto K. Harling, Hingham; Nicholas J. Grant, Winchester, all of Mass.

[73] Assignee: Janez Megusar, Belmont, Mass.

[21] Appl. No.: 760,632

[22] Filed: Jul. 30, 1985

[51] Int. Cl.$^4$ ............ G21C 1/01; G21C 19/03; G21C 16/00; G21B 1/00
[52] U.S. Cl. .................... 376/463; 376/146; 376/150; 376/900; 420/125; 420/422; 420/441
[58] Field of Search ............ 376/900, 410, 463, 150, 376/146; 148/320, 426, 421; 420/125, 441, 422

[56] References Cited

U.S. PATENT DOCUMENTS

| | | | |
|---|---|---|---|
| 3,809,608 | 5/1974 | Katz et al. | 376/463 |
| 4,302,287 | 11/1981 | Hayashi | 376/410 X |
| 4,309,583 | 1/1982 | Krauss et al. | 376/463 X |
| 4,623,387 | 11/1986 | Masumoto et al. | 420/125 X |
| 4,849,124 | 11/1974 | Villani | 420/422 |

OTHER PUBLICATIONS

"Phase Stability in Rapidly Cooled Ni-Nb Alloys Under Ni$^{2+}$ Ion Irradiation" by R. S. Chernock et al., *Acta Metallurgical 32 (4), 521–527 (1984)*.
"Amorphous Phase Formation in the Zirconium-Poor Corner of (Fe, Co, Ni) Systems" M. Nose et al., *Sci. Rep.*, RITU, A28, 232–241 (1980).
"High Strength Microcrystalline Alloys Prepared by Devitrification of Metallic Glass" by R. Roy in J. Mater. Sci., 16 Letters 2924–2927 (1981).
"Development of a Ductile Crystalline Material from $Co_{84}Nb_{10}B_6$ Metallic Glass" by J. Megusar et al. to be published in *Inter. J. of Rapid Solidification*, (Dec. 1985).
"Amorphisation of a Pd-Si Alloy by Irradiation with Fission Products" by D. Lesueur in Fizika 2 Suppl. 2 (1970).
"Ion-Implantation Damage in Amorphous and Crystalline $Nb_{40}Ni_{60}$" by M. D. Rechtin et al. in Scipta Metallurgica, 12, 639–643 (1978).
"On the Characteristics of Amorphous U-Fe Alloys Formed by Liquid Quenching vs. Irradiation Techniques" by R. O. Elliott et al., *Scripta Metallurgica*, 14, 1061–1065 (1980).
"Formation of an Amorphous Alloy by Solid-State Reaction of the Pure Polycrystalline Metals" by R. B. Schwarz et al., *Phys. Review Letters*, 51 (5) 415–418 (1983).
"Structures and Properties of Rapidly Solidified 9Cr-1Mo Steel" by J. Megusar et al., *J. of Nuclear Mat.* 122 & 123 (1984) 789–793.
"Phase Stability In Rapidly Cooled Ni-Nb Alloys Under Ni$^{2+}$ Ion Irradiation" by R. S. Chernock et al., *Acta Metallurgical 32 (4), 521–527 (1984)*.
"Amorphous Phase Formation in the Zirconium-Poor Corner of (Fe, Co, Ni) Systems" N. Nose et al., Sci. Rep. RITU, A28, 232–241 (1980).
"High Strength Microcrystalline Alloys Prepared by Devitrification of Metallic Glass" by R. Ray in J. Mater. Sci., 16 Letters 2924–2927 (1981).
"Development of a Ductile Crystalline Material from $Co_{84}Nb_{10}B_6$ Metallic Glass" by J. Megusar et al. to be published in *Inter. J. of Rapid Solidification*, (Dec. 1985).
"Amorphisation of a Pd-Si Alloy by Irradiation with Fission Products" by D. Lesueur in Fizika 2 Suppl. 2 (1987).
"Ion-Implantation Damage in Amorphous and Crystalline $Nb_{40}Ni_{60}$" by M. D. Rechtin et al., in Scipta Metallurgica, 12, 639–643 (1978).
"On The Characteristics of Amorphous U-Fe Alloys Formed by Liquid Quenching vs. Irradiation Techniques" by R. O. Elliott et al., Scripta Metallurgica, 14, 1061–1065 (1980).
"Formation of an Amorphous Alloy by Solid-State Reaction of the Pure Polycrystalline Metals" by R. B. Schwarz et al., *Phys. Review Letters*, 51 (5) 415–418 (1983).
"Structures and Properties of Rapidly Solidified 9Cr-1Mo Steel" by J. Megusar et al., *J. of Nuclear Mat.* 122 & 123 (1984) 789–793.

*Primary Examiner*—John S. Maples
*Attorney, Agent, or Firm*—Kilpatrick & Cody

[57] ABSTRACT

Method for extending service life of nuclear reactor components prepared from ductile, high strength crystalline alloys obtained by devitrification of metallic glasses. Two variations of the method are described: (1) cycling the temperature of the nuclear reactor between the operating temperature which leads to irradiation damage and a lower temperature at which the alloy is regenerated through an amorphization process; and (2) operating the reactor at a temperature slightly above the amorphization temperature for the alloy wherein irradiation damage of the alloy in the crystalline state is reduced due to a dominant disorder resolution. The method may be optimized for the individual reactor both by selection of the appropriate metallic glass alloy and by selection of the method for decreasing or reversing irradiation damage. This method is applicable to all nuclear conversion technologies involving irradiation damage. In particular, it can be used to extend the service life of the components in the fusion environment, a crucial step in achieving economonical fusion power.

18 Claims, No Drawings

METHOD FOR IMPROVING PERFORMANCE OF IRRADIATED STRUCTURAL MATERIALS

The U.S. Government has rights in this invention by virtue of Department of Energy, Office of Fusion Energy, Grant No. DE-AC02-78ER-10107.

BACKGROUND OF THE INVENTION

This invention relates generally to the field of nuclear reactors and particularly to a method for improving the performance of irradiated structural materials.

Since the first commercial nuclear reactor produced steam for electric power in 1958, most reactors used have been based upon nuclear fission. Principally, light water reactors predominate in the U.S., heavy water reactors predominate in Canada, and gas-cooled reactors are used in the United Kingdom. The fast breeder reactor is in an advanced state of development in a number of countries including France, the U.K., West Germany, and Japan. Fusion reactors are still in the fairly early stages of development.

Despite the growing number of nuclear reactors and improvements in both the design and materials used in their construction, a major problem is the replacement and disposal of radiation damaged structural components. One of the most difficult materials problems is associated with the structural materials of the first wall of fusion reactors.

Most of the present fusion reactor design studies are based on the D-T fusion reaction. This reaction has the lowest ignition temperature and the lowest confinement requirements of all potential reactions. However, most of the energy comes out in the form of 14 MeV neutrons which cause damage to and induce radioactivity in the reactor's first wall structures. To help achieve economical fusion power, increased first wall lifetimes of up to 20-40 years are very desirable. Irradiation damage for a projected 20 year lifetime of the first wall is approximately 400 dpa and accumulated helium is of the order of 6000 appm for a reactor with 2 MW/m$^2$ (d, t) neutron wall loading. There are no conventional alloys available at the present time which are known to be able to withstand these damage levels.

As a result, development of first wall alloy materials has focused on increasing the service life in the fusion environment of known materials. Examples of candidate alloy systems include austenitic stainless steels, ferritic/martensitic steels, and reactive and refractory alloys. These are being systematically studied under simulated fusion reactor conditions and are being optimized through microstructural and compositional modifications. However, even after optimization, the fusion reactor environment produces irreversible structural damage in these alloy systems, and, at a certain damage level, the first all components have to be replaced. Currently available data for all alloys which have been irradiation tested to date provide little hope than an exposure of 400 or more dpa, at the desired operating temperatures, will be possible with acceptable residual material properties. For example, austenitic stainless steels show a steady-state swelling of approximately 1%/dpa. Ferritic alloys appear to have a longer incubation period followed by a minimum swelling rate of approximately 0.06%/dpa.

It is therefore an object of the present invention to provide a process for increasing the lifetimes of nuclear reactor components and thereby increasing the efficiency and decreasing the cost of operating and maintaining the nuclear reactors.

It is a further object of the invention to provide a process for extending the lifetimes of components of both nuclear fission reactors and nuclear fusion reactors.

It is another object of the invention to provide a class of structural materials which can be used to fabricate nuclear reactor components with extended lifetimes despite high levels of irradiation.

It is a still further object of the invention to provide a process for in situ regeneration of nuclear reactor components.

SUMMARY OF THE INVENTION

A The present invention is process for reversing or reducing the effect of a prolonged period of irradiation at an elevated temperature on nuclear reactor components, in particular, components such as the first wall of nuclear fusion reactors.

The process is based on the preparation of nuclear reactor components from ductile crystalline materials obtained by devitrification of metallic glasses. There are two variations of the process. In the first, components formed of the ductile crystalline material are exposed to irradiation at the normal operating temperature. When a certain level of irradiation damage is reached, the operating temperature is lowered below the glass transition temperature in order to partially or fully amorphisize the material, thereby reversing the irradiation induced damage, and then returning the reactor to its normal operating conditions, either directly or after first raising the reactor temperature above the normal operating temperature to develop a desired microstructure. Alternatively, service life of the nuclear reactor components prepared from this class of materials may be extended by operating the nuclear reactor at a constant service temperature which is chosen in such a way that it lies slightly above the amorphization temperature. At this temperature, disorder resolution will be dominant and the amount of radiation damage is greatly decreased.

The following criteria are important in choosing the ductile crystalline materials: (a) material which undergoes thermal neutron reaction, such as boron, should be avoided; (b) the content of the brittle intermetallic phase should be less than about 30 to 40 volume percent so that the material is sufficiently ductile; (c) material should be low activation; and (d) the amorphization temperature of the material should be above the lower limit of the nuclear reactor operating temperature. Irradiation behavior of the ductile crystalline material can be optimized through minor compositional variations and by appropriate processing. Efficiency of the system can be further increased by using refractory alloy systems with high $T_g$.

Examples of material meeting this criteria, based on the available data, include the following:

Fe-base glasses of the general formula:

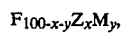
$$F_{100-x-y}Z_xM_y,$$

wherein
F is Fe, Ni, Mn, or Cr;
Z is Zr, Mo, W, or V;
M is C, Si, P, Ti or Al, and
wherein
x is between 5 and 15 and y is between 0 and 10.

Although iron-zirconium base glasses are preferred, Ni, Mn or Cr can be substituted for the iron and Mo, W or V can be substituted for the zirconium.

Refractory metal-base glasses, including Mo, V, Zr, and W-based metallic glasses, developed using the same criteria, can be used at higher operating temperatures.

Examples of ways in which nuclear reactor components can be prepared from this class of materials include hot consolidation or dynamic (shock) compaction of amorphous ribbons or powders; solid state reaction of the pure polycrystalline metals; and in crystalline form with subsequent reversion to the amorphous state by neutron irradiation. New approaches may be developed in the future for preparation of the amorphous alloys.

DETAILED DESCRIPTION OF THE INVENTION

Method for extending the service life of nuclear reactor components prepared from ductile, high strength crystalline alloys obtained by devitrification of metallic glasses. Two variations of the method are described: (1) cycling the temperature of the nuclear reactor between the operating temperature which leads to irradiation damage and a lower temperature at which the alloy is regenerated through an amorphization process; and (2) operating the reactor at a temperature slightly above the amorphization temperature for the alloy wherein irradiation damage to the alloy in the crystalline state is reduced due to dominant disorder resolution at this temperature.

The method may be optimized for the individual reactor both by selection and processing of the appropriate metallic glass alloy and by selection of the process for regeneration. The method is applicable to all nuclear conversion technologies involving irradiation damage including both fission reactors and fusion reactors.

The process whereby the irradiation damage is reversed has two forms. The first can be carried out by cycling the operating temperature of the reactor between the normal high temperature (leading to severe irradiation damage in the crystalline materials) and a lower temperature at which the irradiation induced damage is reversed through the amorphization process. Important parameters include irradiation dose and temperature at which regeneration of the microstructure takes place.

The second form of the process for reducing irradiation damage requires selection of alloy systems which eventually revert to the amorphous state under irradiation. The service life of the nuclear reactor components prepared from this class of materials is extended by operating the nuclear reactor at a constant temperature selected to lie slightly above the amorphization temperature. Dominant disordering resolution at this temperature does not convert the alloy to the amorphous state. It has been shown by R. S. Chernock and K. C. Russell in *Acta Metallurgica* 32, 521 (1984) in rapidly solidified microcrystalline Ni-15 atom % Nb that irradiation to 20 dpa at 527° C. gave partial dissolution of the existing microstructure and only a few voids were observed. It has been observed in conventional crystalline alloys that precipitates redissolve at lower irradiation temperatures due to a recoil resolution process. This could be further enhanced in these alloy systems under controlled conditions.

The following criteria are important in choosing compositions of ductile crystalline materials developed from metallic glasses for use as nuclear reactor components in the method of the present invention: (a) material which undergoes thermal neutron reaction, such as boron, should be avoided; (b) the content of the brittle intermetallic phase should be less than about 30 to 40 volume percent so the material is sufficiently ductile; (c) material should be low activation; and (d) the amorphization temperature should be above the lower temperature limit imposed by the nuclear reactor operation. Irradiation behavior of the ductile crystalline material can be optimized through minor compositional variations and by appropriate processing.

Alloys which undergo thermal neutron reaction are not useful in the present invention. Most metal-metalloid type metallic glasses which have been devitrified to develop a ductile crystalline material contain boron. These alloys, however, are not suitable for design of nuclear reactor components because boron undergoes thermal neutron reaction forming lithium and helium.

Crystallization of metallic glasses may produce brittle or ductile fully crystallized structures depending on composition. The volume fraction and size of the brittle intermetallic phase is the controlling factor in the ductile versus brittle behavior of devitrified metallic glasses. The content of the brittle intermetallic phase should be less than about 30 to 40 volume percent to insure sufficient ductility of the crystallized material.

Material should be low activation based on safety considerations, need for remote maintenance and management and disposal of waste material, as discussed by E. E. Bloom, et al., in *Journal of Nuclear Materials*, 122 & 123, 17 (1984).

The proposed process for extending the service life of nuclear reactor components, either through a cycling operation or through selection of operating temperature, is critically dependent on the amorphization temperature of the alloy. It is therefore important that the alloy system be compatible with the nuclear reactor design criteria, i.e., that the amorphization temperature of the alloy be above the lower temperature limit for operating the nuclear reactor.

To increase the efficiency of the nuclear conversion system, alloy systems with high $T_g$ are desirable. The glass transition temperature $T_g$, or $T_x$ in the absence of a measurable $T_g$, represent the upper limit of a service temperature for the glassy alloys which crystallize into a brittle crystalline phase.

A number of metallic glass alloys may be useful in the method of the present invention based on the available data, including Fe-base metallic glass and refractory metal-base metallic glass.

Fe-base glasses have a relatively high $T_g$ of approximately 500° C. which may be raised somewhat by compositional modifications. Based on the above-described criteria and the available data, the presently preferred alloy compositions are the Fe-base glasses having the general formula $$F_{100-x-y}Z_xM_y,$$

wherein
F is Fe, Ni, Mn, or Cr;
Z is Zr, Mo, W, or V;
M is C, Si, Ti, P or Al; and
wherein
x is between 5 and 15 and y is between 0 and 10.

Iron-zirconium metallic glasses are preferred. Additions of small amounts of C, Si, Ti, P, or Al modify composition, structure and distribution of the intermetallic phase and have an effect on mechanical properties and swelling resistance. A number of metal-metal glassy alloy systems reported by M. Nose and T. Masumoto in Sci. Rep. RITU, A28, 232(1980), such as Fe-Zr (9–11 at % Zr) and Ni-Zr(10–11 at % Zr) have been developed. These metal-metal glassy alloys have been shown to have attractive properties when crystallized to produce a variety of structures.

The mechanical properties and structure of this class of metallic glasses are similar to a new class of metallic glasses which also shows very high strength and sufficient ductility upon crystallization to be a useful engineering material in the crystallized state. These iron-, nickel- or cobalt-base metallic glasses are disclosed by R. Ray in *J. Mater. Sci.* 16, Letters 2924 (1981); C. Ashdown, PH.D. Thesis, MIT (1983); and J. Megusar et al. in *Inter. J. of Rapid Solidification* (to be published).

The microstructures of these alloys are characterized by a very fine and uniform grain size (in the near-micron range), with an equally fine dispersion of intermetallic phases. Room temperature tensile strength values can be quite high. Table 1 shows, for example, the room temperature tensile properties and grain size of a fully crystallized $FeCr_{25}Ni_{20}B_{8-12}$ alloy (composition in at %) after hot extrusion and subsequent hot swaging. In general, these alloys show good structural and mechanical stability in the crystalline state in the intermediate temperature range. At higher temperature (1073° to 1373° K.) they are superplastic due to their fine grain size and multiphase microstructures. The development of a ductile crystalline material from the amorphous state is discussed by J. Megusar et al in the *Int. J. of Rapid Solidification* (1985).

TABLE 1

| Room temperature tensile properties and grain size of $FeCr_{25}Ni_{20}B_{8-12}$ crystallized alloy | | | | |
|---|---|---|---|---|
| Extrusion temperture (K) | 0.2% YS (MPa) | UTS (MPa) | Elongation (%) | Grain size (m) |
| 1173 | 1041 | 1248 | 10 | 0.6 |
| 1073 | 1289 | 1468 | 6 | 0.3 |

Fine scale microstructure in crystalline alloys is beneficial in controlling swelling in some circumstances. It has been shown by R. S. Chernook and K. C. Russell in Acta Met (to be published) in rapidly solidified microcrystalline $Ni_{85}Nb_{15}$ alloy, with a fine cellular structure, that $Ni^{2+}$ ion irradiation to 20 dpa at 700–900 K drives the microstructure along a path different from that of thermal evolution and results in the formation of only a few small voids.

Unlike conventional crystalline alloys, this new class of alloys can be reverted to the amorphous state by irradiation at T less than $T_g$, for example, by irradiation at a temperature below 775° K. for $FeCr_{25}Ni_{20}B_{8-12}$ and $Fe_{90}Zr_{10}$ alloys. It has also been shown in several other amorphous systems that partically or fully crystallized alloys can be reverted to the amorphous state (re-amorphization) by irradiation at selected temperatures below the glass transition temperature. Such systems include Pd-Si, as shown by D. Leseur in *Fizike* 2, Suppl. 2, 13.1 (1970), U-Fe, as shown by R. D. Elliot et al in *Scripta Met.* 14, 1061 (1980), and Ni-Nb, as shown by M. D. Rechtin et al, in *Scripta Met* 12, 639 (1978). In principle, the reversion of irradiation damage processes which normally lead to swelling and embrittlement in crystalline materials allows regeneration of the pre-irradiation microstructure of the nuclear reactor component materials. It is to be emphasized, however, that the metallic glasses containing B or Co will not work in the present invention because of thermal neutron reaction and high activity.

Refractory metal-base glasses such as Mo, Zr, V, and W-based glasses are useful at higher temperatures. The Mo-, V-, Zr-, and W-base metallic glasses are refractory metals which meet the activation criteria.

There is an empirical rule that glass formability is enhanced near deep eutectic compositions. This has been confirmed for $Fe_{90}Zr_{10}$ glass, for example, with a deep eutectic at 10 atom % Zr. Deep eutectics found at much higher atom % Zr are not useful since the volume fraction of brittle intermetallic phase in the crystallized alloy is greater than 30 to 40 volume percent. Available phase diagrams of refractory metals suggest that Mo-C, Zr-Si and Sr-W with deep eutectics at 12 atom % C, 9 atom % Si and 10 atom % W, respectively, are useful. More data, however, are needed to fully assess the potential of refractory metal-base metallic glasses which can be devitrified into a ductile crystalline material for nuclear reactor applications at higher operating temperatures.

Irradiation behavior of ductile crystalline materials developed from metallic glasses can be optimized through minor compositional modifications. For example, it has been shown in The Fusion Reactor Materials Program Plan, DOE/ET-0031/21, July 1978 that small additions, on the order of a fraction of a weight percent, of C, Si, P, Ti, V and Al are beneficial in suppressing swelling of conventional crystalline systems, such as austenitic and ferritic stainless steels.

Structural components such as the fission reactor core integral components and the fusion reactor first wall may be formed from these metallic glasses using methods known to those skilled in the art. The present state-of-the-art of glassy alloy technology includes preparation of rapidly solidified ribbons (Allied Corp., General Electric, Marco Materials, and others) or powders (Massachusetts Institute of Technology, Northeastern University) at cooling rates of $10^4$ to $10^6$ K/s, and subsequent consolidation. Consolidation techniques which have been studied include hot extrusion and hot mechanical pressing and it has been shown that glassy structure can be retained during such processing. A particularly promising approach appears to be a slow-rate extrusion, as the metallic glasses show a strain rate dependent homogeneous deformation behavior in the temperature range close to $T_g$. The dynamic compaction technique and explosive compaction have also resulted in a retention of the glassy structure. Amorphous alloys have been also formed by solid state reaction of the pure polycrystalline metals, as shown by R. B. Schwartz and W. L. Johnson, *Physical Review Letters*, 51 (5), 415 (1983).

These alloys can also be prepared for use as first wall components in the crystalline state directly from the melt by the liquid dynamic compaction (LDC) process. An example of liquid dynamic compaction applied to 9Cr-1Mo steel is reported by J. Megusar et al in *J. Nuclear Materials*, 122 & 123, 789–793 (1984). In this technique, molten metal is atomized and delivered at high velocity as partially solidified fine droplets, initially, against a high conductivity metallic substrate and, subsequently, against the previously deposited layers of quenched alloy. Thicknesses on the order of the CTR first wall thickness have been deposited in a one-step operation, directly from the melt. Solidification rates are high but secondary (solid state) cooling is relatively slow and the resulting structures of the alloys prepared by this technique are therefore not expected to be amorphous. It is possible, however, to revert selected microstructures to the amorphous state by subsequent neutron irradiation.

Irradiation behavior of ductile crystalline material developed from metallic glasses can be optimized by varying the processing method. Preliminary data indicate a reduced swelling in rapidly solidified austenitic stainless steel with increased carbon and titanium content consolidated by dynamic (shock) compaction and irradiated in an EBR-II reactor to 15 dpa in the temperature range of 400° to 550° C. At the present time, the preferred processing route is preparation of metallic glass ribbons, crystallization of ribbons to develop a desired microstructure, powderization of crystallized ribbons and dynamic (shock) compaction of powders.

In fusion reactors, the irradiation temperature at which regeneration of microstructure takes place may effect plasma operation and require some design modification of the cooling system. Detailed studies to determine the irradiation temperature range in which the regeneration of the microstructure is expected to occur and to determine the mechanical stability of the alloy in this temperature range may be done using methods known to those skilled in the art. The available data indicate that the upper boundary for the amorphization process (i.e., the lowest dpa level and, in particular, the highest irradiation temperature) is a function of alloy composition. It is therefore possible, through alloy development, to vary $T_g$ in order to increase the temperature at which the irradiation induced damage can be reversed through the amorphization process above the lower temperature limit imposed by reactor operation.

Although this invention has been described with reference to a specific use in reducing or reversing irradiation damage of nuclear reactor components formed from crystallized metallic glass, it is understood that modifications and variations of the compositions and method will occur to those skilled in the art. It is intended that all such modifications be included within the scope of the appended claims.

We claim:
1. A process for reducing radiation damage of nuclear reactor components comprising:
    (a) selecting an alloy of a strong, ductile, crystalline material obtained by devitrification of a metallic glass;
    wherein the amorphization temperature of said metallic glass alloy is less than the melting temperature of the alloy, and greater than the lower limit of the operating temperature of the nuclear reactor;
    wherein said alloy does not undergo thermal neutron reactions; and
    wherein said alloy has low activation;
    (b) processing said alloy to form components for use in a nuclear reactor;
    (c) installing the components in a nuclear reactor;
    (d) operating the nuclear reactor at a temperature slightly above the amorphization temperature of said alloy.
2. The process of claim 1 wherein before the reactor is returned to the normal operating temperature the reactor is operated at a temperature higher than the normal operating temperature until a microstructure showing ductile behavior at room temperature is developed.

3. The process of claim 1 wherein the alloy selected comprises a refractory metal-base metallic glass wherein the refractory metal is selected from the group consisting of Mo, V, Zr and W.

4. The process of claim 1 further comprising optimizing the performance of the selected alloy by making minor compositional modifications to said alloy.

5. The process of claim 1 wherein the processing said alloy comprises liquid dynamic compaction.

6. The process of claim 1 wherein the processing of said alloy comprises solid state reaction of the pure polycrystalline metal.

7. The process of claim 1 wherein the alloy is selected from compositions comprising:

$$F_{100-x-y}Z_xM_y,$$

wherein
    F is selected from the group consisting of Fe, Ni, Mn, and Cr;
    Z is selected from the group consisting of Zr, Mo, W, and V;
    M is selected from the group consisting of C, Si, Ti, P and Al; and
wherein
    x is between 5 and 15 and
    y is between 0 and 10.

8. The process of claim 7 wherein the selected alloy comprises less than about 40 volume percent brittle intermetallic phase.

9. The process of claim 7 wherein the alloy has the general formula $Fe_{100-x-y}Zr_xM_y$.

10. The process of claim 1 wherein the processing of said alloy comprises dynamic (shock) compaction.

11. The process of claim 10 wherein the processing the said alloy comprises:
    preparing metallic glass ribbons;
    crystallizing the ribbons to develop a desired microstructure;
    powdering the crystallized ribbons; and
    compacting the powder.

12. A process for reversing radiation damage of nuclear reactor components without removing the components from the reactor comprising the steps of operating the nuclear reactor under normal operating conditions until said alloy is damaged by irradiation;
    operating the nuclear reactor at a lower temperature at or below the amorphization temperature of said alloy, wherein the amorphization temperature is less than the melting temperature of the alloy, until said alloy is amorphisized, and
    returning the nuclear reactor to the normal operating temperature.

13. The process of claim 12 wherein before the reactor is returned to the normal operating temperature the reactor is operated at a temperature higher than the normal operating temperature until a microstructure showing ductile behavior at room temperature is developed.

14. The process of claim 12 wherein the alloy selected comprises a refractory metal-base metallic glass wherein the refractory metal is selected from the group consisting of Mo, V, Zr and W.

15. The process of claim 12 further comprising optimizing the performance of the selected alloy by making minor compositional modifications to said alloy.

16. The process of claim 12 wherein the alloy is selected from compositions comprising:

$$F_{100-x-y}Z_xM_y,$$

wherein

F is selected from the group consisting of Fe, Ni, Mn, and Cr;

Z is selected from the group consisting of Zr, Mo, W, and V;

M is selected from the group consisting of C, Si, Ti, P and Al; and wherein x is between 5 and 15 and y is between 0 and 10.

17. The process of claim 16 wherein the selected alloy comprises less than about 40 volume percent brittle intermetallic phase.

18. The process of claim 16 wherein the alloy has the general formula $Fe_{100-x-y}Zr_xM_y$.

* * * * *